United States Patent
Lin et al.

(10) Patent No.: US 10,146,098 B2
(45) Date of Patent: Dec. 4, 2018

(54) TRANSPARENT DISPLAY DEVICE

(71) Applicant: National Sun Yat-sen University, Kaohsiung (TW)

(72) Inventors: Tsung-Hsien Lin, Kaohsiung (TW); Cheng-Chang Li, Kaohsiung (TW); Hung-Chang Jau, Kaohsiung (TW); Sin-An Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 15/402,292

(22) Filed: Jan. 10, 2017

(65) Prior Publication Data

US 2018/0143467 A1 May 24, 2018

(30) Foreign Application Priority Data

Nov. 23, 2016 (TW) .............................. 105138412 A

(51) Int. Cl.
G02F 1/1333 (2006.01)
G02F 1/137 (2006.01)
G02F 1/1343 (2006.01)
G02F 1/1335 (2006.01)
G02F 1/1347 (2006.01)

(52) U.S. Cl.
CPC .......... G02F 1/137 (2013.01); G02F 1/13475 (2013.01); G02F 1/133512 (2013.01); G02F 1/134309 (2013.01); G02F 2001/13706 (2013.01); G02F 2202/043 (2013.01); G02F 2203/01 (2013.01)

(58) Field of Classification Search
CPC .. G02F 1/1333; G02F 1/137; G02F 1/134309; G02F 1/133512; G02F 1/13475; G02F 2203/01; G02F 2202/043; G02F 2001/13706
USPC .................................................... 252/299.01
See application file for complete search history.

(56) References Cited

U.S. PATENT DOCUMENTS

| 2013/0258252 A1 | 10/2013 | Hsieh et al. |
| 2014/0307430 A1 | 10/2014 | Lo et al. |
| 2015/0185542 A1 | 7/2015 | Su et al. |
| 2015/0355514 A1 | 12/2015 | Lin et al. |
| 2017/0132962 A1 | 5/2017 | Tang |

FOREIGN PATENT DOCUMENTS

| CN | 105242447 A | 1/2016 |
| JP | 201485664 A | 5/2014 |
| JP | 2015230484 A | 12/2015 |
| TW | 201442216 A | 11/2014 |

*Primary Examiner* — Geraldina Visconti
(74) *Attorney, Agent, or Firm* — Mark M. Friedman

(57) ABSTRACT

A transparent display device is provided with a first liquid crystal layer having a first electrode, a second electrode, a plurality of first liquid crystal molecules, and a plurality of first chiral molecules disposed between the first electrode and the second electrode; and a second liquid crystal layer having a third electrode, a fourth electrode, a plurality of second liquid crystal molecules, a plurality of second chiral molecules, and a dichroic dye disposed between the third electrode and the fourth electrode. The first liquid crystal molecules and the second liquid crystal molecules both have positive anisotropies, and the dichroic dye has a visible absorption wavelength ranged from 400 to 780 nm.

8 Claims, 6 Drawing Sheets

TRANSPARENT DISPLAY DEVICE

CROSS REFERENCE TO RELATED APPLICATIONS

This application claims the benefit of priority of Taiwan Patent Application No. 105138412, filed on Nov. 23, 2016, the disclosure of which is incorporated herein by reference.

FIELD OF THE INVENTION

The present invention relates to a transparent display device, and in particular to a transparent display device having two cholesteric liquid crystal layers to achieve high contrast.

BACKGROUND OF THE INVENTION

Current transparent liquid crystal displays generally have insufficient transparencies due to their complex multi-layer structures. If a transparent display is made of a self-emitting transparent OLED (organic light emitting diode), a high transmittance characteristic can be maintained. However, in addition to the absence of a "dark state" resulting in low contrast and poor image quality, it is also susceptible to external ambient light which causes distortion of the image. The viewing quality needs to be improved.

An additional shielding layer has been used to solve the problem of poor contrast. For example, in China Patent Publication No. CN105242447, a transparent display provided with a shielding layer is disclosed, but it has disadvantages including only 33% of transmittance and a white mist state of the activated shielding layer. Therefore, the contrast cannot be improved efficiently and thus the display quality is still poor.

It is therefore necessary to provide a transparent display device with high transmission and enhanced contrast in order to solve the problems existing in the conventional technology as described above.

SUMMARY OF THE INVENTION

A primary object of the present invention is to provide a transparent display device with two cholesteric liquid crystal layers. One layer is used for displaying images and another is used for adjusting contrast. Therefore, the transparent or opaque states can be switched under various requirements. The transparent display device uses dichroic dyes mixed in one layer of the cholesteric liquid crystal so as to make the scattering state (Focal conic) and absorption state (Planar) have a dark color (such as black or gray-black). The contrast of the transparent display device can be promoted according to different requirements. Because the transparent display device has a simple structure, the additional backlight module and diffuser film are not necessary, and the transmittance can reach 60%.

To achieve the above objects, the present invention provides a transparent display device, comprising a first liquid crystal layer comprising a first electrode, a second electrode, a plurality of first liquid crystal molecules, and a plurality of first chiral molecules, wherein the first liquid crystal molecules and the first chiral molecules are disposed between the first electrode and the second electrode; and a second liquid crystal layer disposed on one side of the first liquid crystal layer, wherein the second liquid crystal layer comprises a third electrode, a fourth electrode, a plurality of second liquid crystal molecules, a plurality of second chiral molecules, and a dichroic dye, and the second liquid crystal molecules, the second chiral molecules, and the dichroic dye are disposed between the third electrode and the fourth electrode; wherein the first liquid crystal molecules and the second liquid crystal molecules both have positive anisotropies, the dichroic dye has a visible absorption wavelength ranged between 400 to 780 nm.

In one embodiment of the present invention, the first chiral molecules and the second chiral molecules are independently selected from a group consisting of

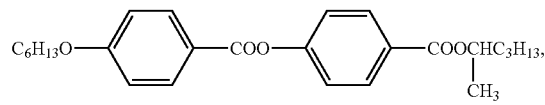

R811

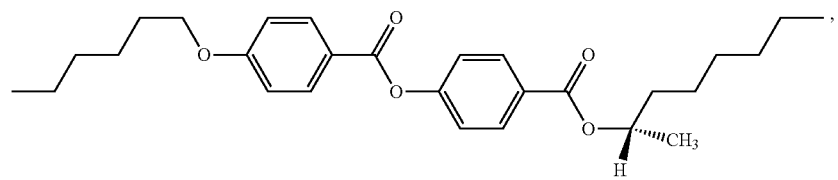

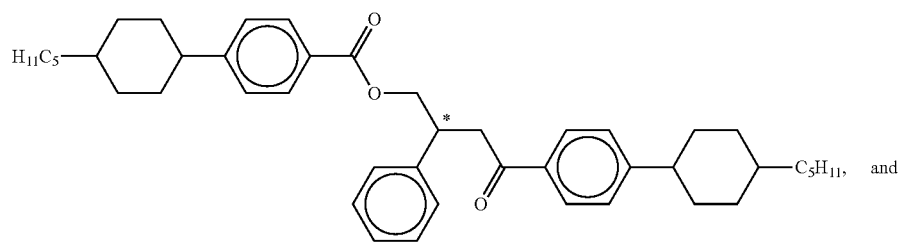

and

-continued

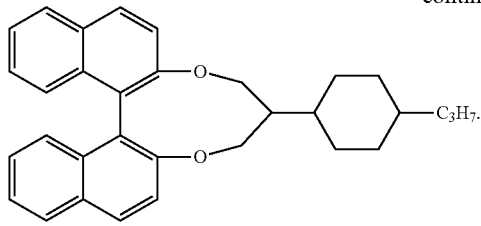

In one embodiment of the present invention, the first liquid crystal layer has a display area to display a data image.

In one embodiment of the present invention, the first liquid crystal molecules perform a reflection state to allow the first liquid crystal layer to reflect at least a part of the visible light so as to display the data image.

In one embodiment of the present invention, the second liquid crystal layer forms a shielding area corresponding to the data image.

In one embodiment of the present invention, the shielding area is black or dark gray.

In one embodiment of the present invention, the second liquid crystal molecules perform an absorption state or a scattering state within the shielding area to cover a light source passing through the second liquid crystal layer.

In one embodiment of the present invention, the first electrode and the second electrode provide a first electric field to allow the first liquid crystal molecules to perform a transparent state, a reflection state, or a scattering state.

In one embodiment of the present invention, the third electrode and the fourth electrode provide a second electric field to allow the second liquid crystal molecules to perform a transparent state, an absorption state, or a scattering state.

DETAILED DESCRIPTION OF THE PREFERRED EMBODIMENTS

The structure and the technical means adopted by the present invention to achieve the above and other objects can be best understood by referring to the following detailed description of the preferred embodiments. Furthermore, if there is no specific description in the invention, singular terms such as "a", "one", and "the" include the plural number. For example, "a compound" or "at least one compound" may include a plurality of compounds, and the mixtures thereof. If there is no specific description in the invention, "%" means "weight percentage (wt %)", and the numerical range (e.g., 10% to 11% of A) contains the upper and lower limit (i.e., 10%≤A≤11%). If the lower limit is not defined in the range (e.g., less than, or below 0.2% of B), it means that the lower limit may be 0 (i.e., 0%≤B≤0.2%). The proportion of "weight percent" of each component can be replaced by the proportion of "weight portion" thereof. The abovementioned terms are used to describe and understand the present invention, but the present invention is not limited thereto.

Figure 1:
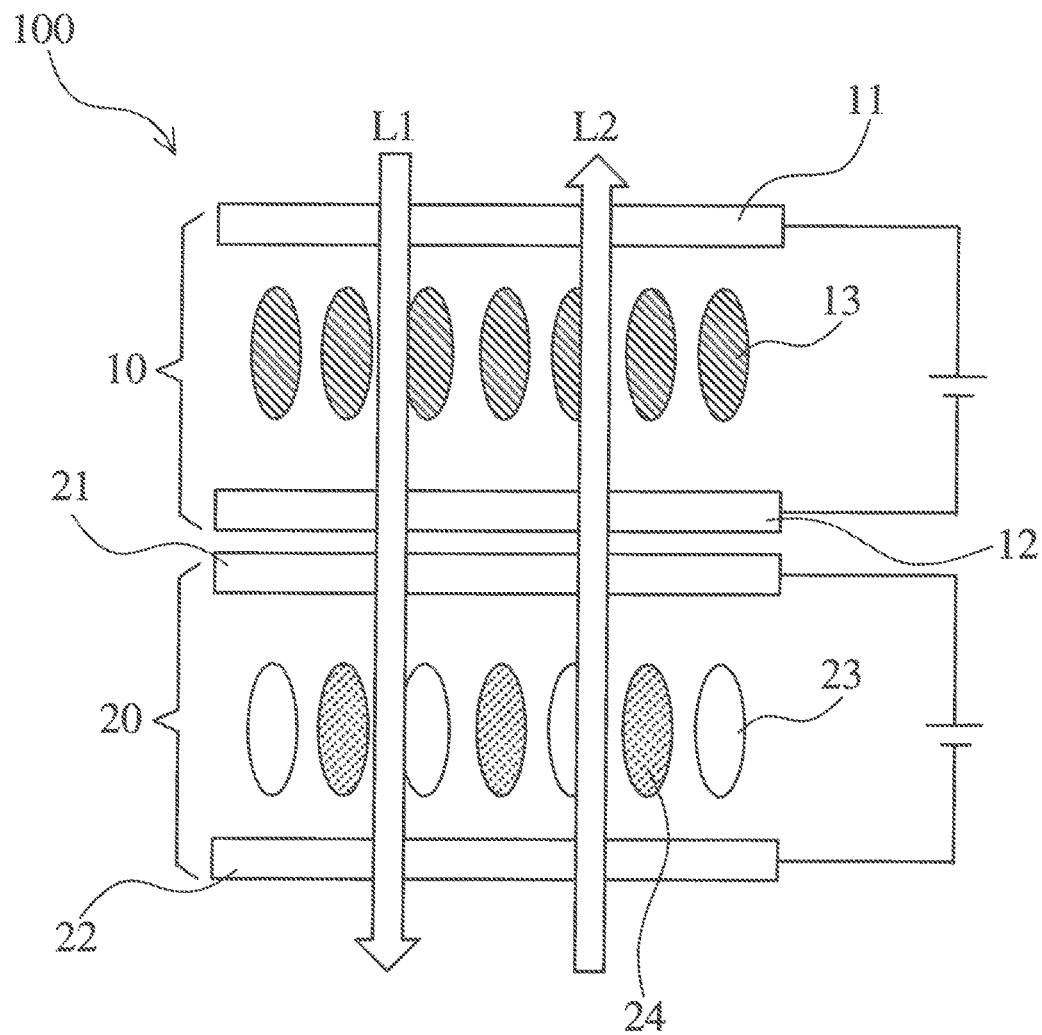
FIG. 1 is a schematic view showing a transparent state (bright state) of a transparent display device according to one embodiment of the present invention.

Refer to FIG. 1; one embodiment of the present invention is to provide a transparent display device 100, mainly comprising a first liquid crystal layer 10 and a second liquid crystal layer 20. The first liquid crystal layer 10 reflects ambient light to serve as a reflective display device. The second liquid crystal layer 20 covers ambient light from a side where the first liquid crystal layer 10 is configured, or covers a background information or a background image from a side where the second liquid crystal layer 20 is configured, to serve as a shielding element, so that the transparent display device 100 can display a data image more clearly and prevent the transparent display device 100 from interference of the background information or the ambient light. The contrast is also increased to promote the display quality of the transparent display device 100. In addition, the transparent display device referred to of the present invention excludes the traditional display device with a backlight sources. Overall, the backside information behind the transparent display device can be seen through the transparent display device and thus the transparent display device is applicable to a window or building compartments.

Refer to FIG. 1, the first liquid crystal layer 10 of the transparent display device 100 according to one embodiment of the present invention comprises a first electrode 11, a second electrode 12, a plurality of first liquid crystal molecules 13, and a plurality of first chiral molecules (not shown). The first liquid crystal molecules 13 and the first chiral molecules are disposed between the first electrode 11 and the second electrode 12.

The second liquid crystal layer 20 is disposed on one side of the first liquid crystal layer 10, for example, a lower surface of the first liquid crystal layer 10 as shown in FIG. 1. The second liquid crystal layer 20 comprises a third electrode 21, a fourth electrode 22, a plurality of second liquid crystal molecules 23, a plurality of second chiral molecules (not shown), and a dichroic dye 24. Similarly, the second liquid crystal molecules 23, the second chiral molecules, and the dichroic dye 24 are disposed between the third electrode 21 and the fourth electrode 22. Preferably, the first liquid crystal molecules 13 and the second liquid crystal molecules 23 both have positive anisotropies. That is, they are generally called liquid crystals with positive anisotropies. The dichroic dye 24 has a visible absorption wavelength ranged from 400 to 780 nm, such as 400, 500, 600, or 700 nm, but it is not limited thereto. The second liquid crystal layer 20 has the dichroic dye 24 which can absorb a specific wavelength of visual light so that the shielding area shows a black color or a dark-gray color. The transmittance is between 0.5% and 20%, for example 0.5%, 5%, 10%, or 20%, but it is not limited thereto. Preferably, the dichroic dye 24 has a long-axial absorption greater than a short-axial absorption. The dichroic dye 24 has a long-axial arrangement in a direction the same as that of the second liquid crystal molecules 23. The dichroic dye 24 can be S428 (Mitsui Chemicals), but it is not limited thereto.

In one embodiment of the present invention, the first chiral molecules and the second chiral molecules are preferably independently selected from a group consisting of Furthermore, the first electrode 11 and the second electrode 12 can provide a first electric field to allow the first liquid crystal molecules 13 performing a transparent state, a reflection state, or a scattering state; a transparent state, an absorption state, or a scattering state allow the third electrode 21 and the fourth electrode 22 to provide a second electric field to allow the second liquid crystal molecules 23 to perform a transparent state, an absorption state, or a scattering state. By using various states of the first liquid crystal molecules 13 and the second liquid crystal molecules 23, the various displays and applications can be achieved. As shown in FIG. 1, when the first liquid crystal molecules and the second liquid crystal molecules both perform the trans-

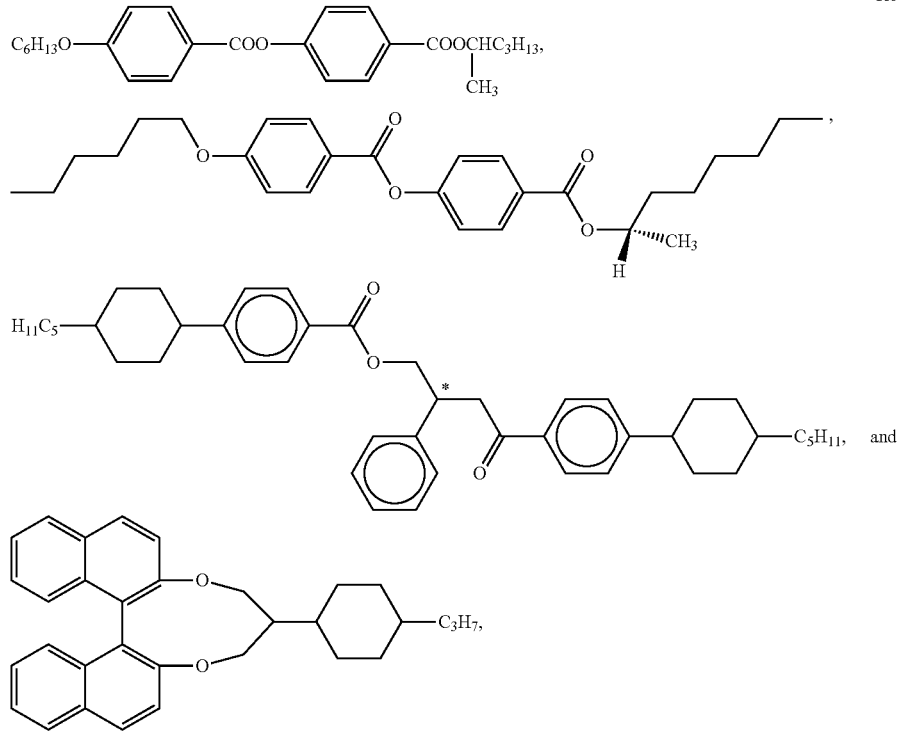

but they are not limited thereto. Generally, the chiral molecules which can be used together with the first liquid crystal molecules 13 and the second liquid crystal molecules 23 (liquid crystals with positive anisotropies) for forming cholesteric liquid crystals are applicable.

Figure 2:
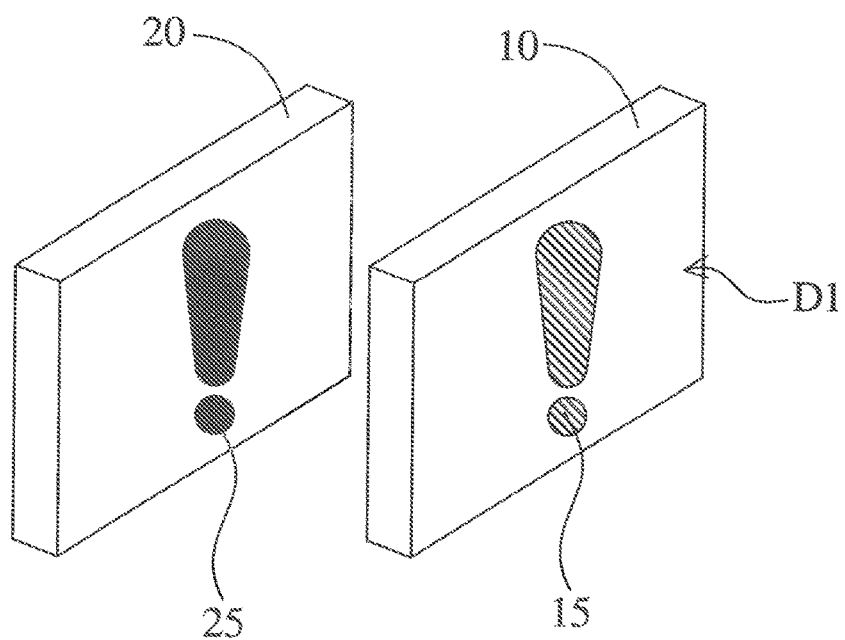
FIG. 2 is a schematic view showing a data image and a shielding area of a transparent display device according to one embodiment of the present invention.

Refer to FIG. 2; the first liquid crystal layer 10 has a display area D1 for displaying a data image 15. The first liquid crystal molecules of the first liquid crystal layer 10 perform a refection state, so that the first liquid crystal layer 10 can reflect at least a part of a light source L1 (reflected lights are referred to L1'), to display the data image 15. The second liquid crystal layer 20 forms a shielding area 25 corresponding to the data image 15. The light source L1 can be any light in the environment, but it is not limited thereto.

Figure 3A:
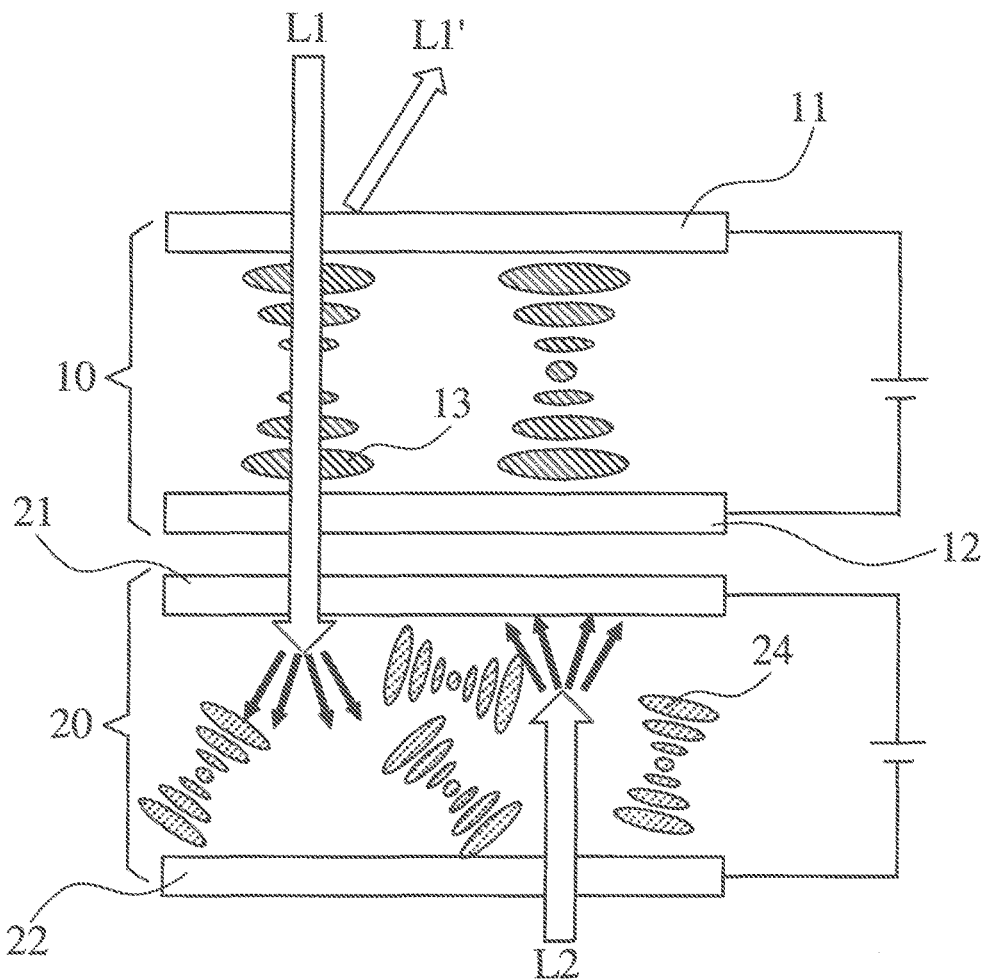
FIGS. 3A and 3B are schematic views showing a display type of a transparent display device according to one embodiment of the present invention.
Figure 3B:
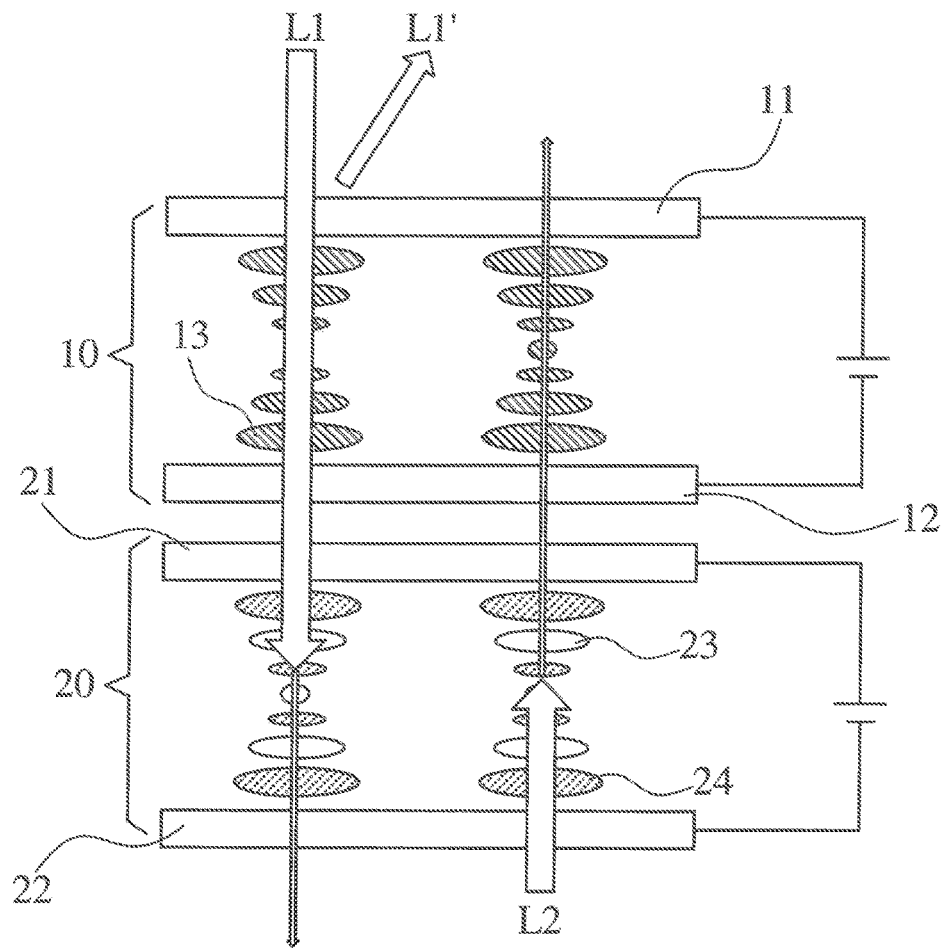
Figure 4:
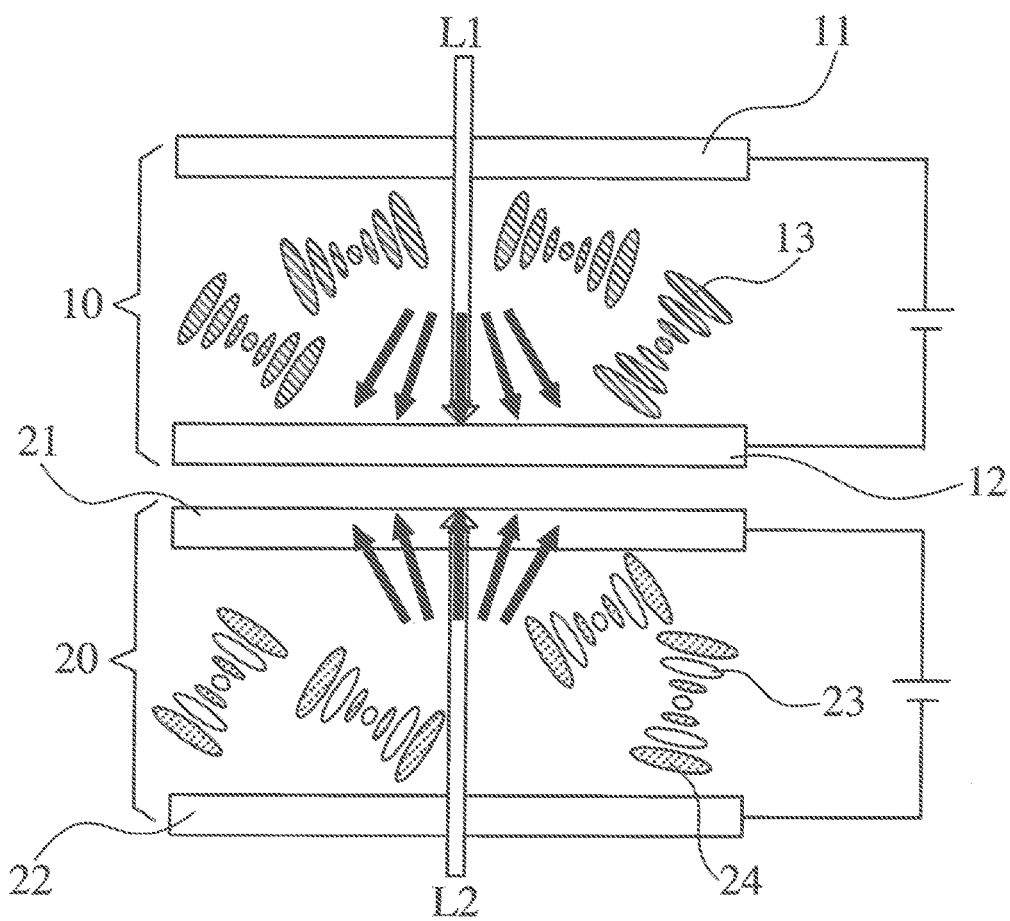
FIG. 4 is a schematic view showing a shielding type of a transparent display device according to one embodiment of the present invention.
Figure 5:
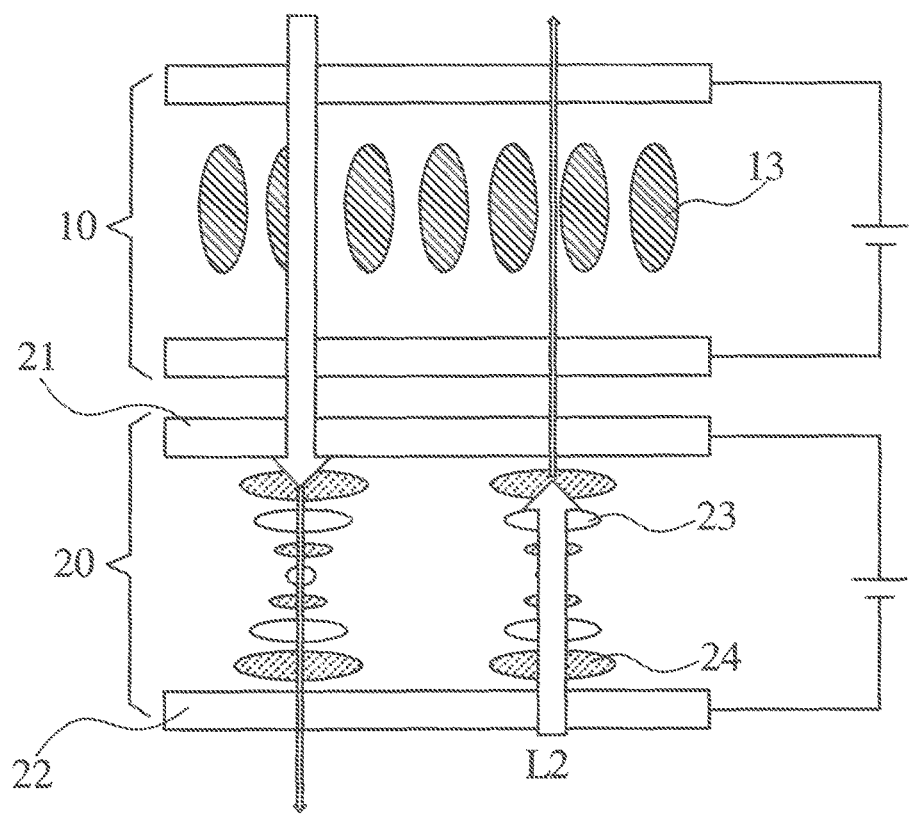
FIG. 5 is a schematic view showing a transparent dark state of a transparent display device according to one embodiment of the present invention.

Refer to FIGS. 3A and 3B; within the shielding area as shown in FIG. 2, the second liquid crystal molecules 23 performs a scattering state (FIG. 3A) or an absorption state (FIG. 3B), so as to cover at least a part of light source L2 passing through the second liquid crystal layer 22. The light source L2 can be a reflected light in the background or a self-emitting light. Meanwhile, the transparent display device 100 can perform a display status with a high contrast.

parent state, the transparent display device can be used as a normal glass; as shown in FIGS. 3A and 3B, when the first liquid crystal molecules 13 perform the reflection state and the second liquid crystal molecules 23 perform the absorption state, the first liquid crystal layer 10 can display colorful images, and the light source L1 can partially pass through the second liquid crystal layer 20 (partially absorbed by the second liquid crystal layer 20) to show a dark status, and thus the transparent display device 100 can be a display device and the second liquid crystal layer 20 can be used for enhancing contrast; as shown in FIG. 4, when the first liquid crystal molecules 13 and the second liquid crystal molecules 23 both perform the scattering state (or the second liquid crystal molecules 23 perform the absorption state as shown in FIG. 5), the transparent display device 100 can be used as a private shield or a shading board. It is appreciated that the combinations of the first and second liquid crystal layer are not limited to the abovementioned combinations. Since the second liquid crystal layer 20 according to one embodiment of the present invention includes the dichroic dye 24, the shielding area 25 is approximately black in the absorption state (but light permeable), and gray-black in the scattering state. Therefore, the contrast between the data image 15 and the background can be improved.

The present invention has been described with preferred embodiments thereof and it is understood that many changes and modifications to the described embodiments can be carried out without departing from the scope and the spirit of the invention that is intended to be limited only by the appended claims.

What is claimed is:

1. A transparent display device, comprising:
   a first liquid crystal layer comprising a first electrode, a second electrode, a plurality of first liquid crystal molecules, and a plurality of first chiral molecules, wherein the first liquid crystal molecules and the first chiral molecules are disposed between the first electrode and the second electrode; and
   a second liquid crystal layer disposed on one side of the first liquid crystal layer, wherein the second liquid crystal layer comprises a third electrode, a fourth electrode, a plurality of second liquid crystal molecules, a plurality of second chiral molecules, and a dichroic dye, and the second liquid crystal molecules, the second chiral molecules, and the dichroic dye are disposed between the third electrode and the fourth electrode;
   wherein the first chiral molecules and the first liquid crystal molecules form a plurality of first cholesteric liquid crystals; the second chiral molecules and the second liquid crystal molecules form a plurality of second cholesteric liquid crystals;
   the first liquid crystal molecules and the second liquid crystal molecules both have positive anisotropies, the dichroic dye has a visible absorption wavelength ranged between 400 to 780 nm;
   wherein the first chiral molecules and the second chiral molecules are independently selected from a group consisting of

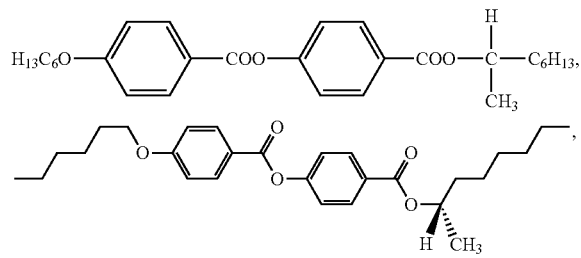

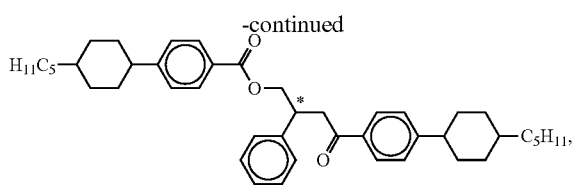

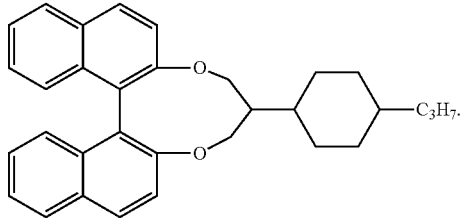

2. The transparent display device according to claim 1, wherein the first liquid crystal layer has a display area to display a data image.

3. The transparent display device according to claim 2, wherein the first liquid crystal molecules perform a reflection state to allow the first liquid crystal layer reflecting at least a part of the visible light so as to display the data image.

4. The transparent display device according to claim 3, wherein the second liquid crystal layer forms a shielding area corresponding to the data image.

5. The transparent display device according to claim 4, wherein the shielding area is black or dark gray.

6. The transparent display device according to claim 5, wherein the second liquid crystal molecules perform an absorption state or a scattering state within the shielding area to cover a light source passing through the second liquid crystal layer.

7. The transparent display device according to claim 1, wherein the first electrode and the second electrode provide a first electric field to allow the first liquid crystal molecules to perform a transparent state, a reflection state, or a scattering state.

8. The transparent display device according to claim 1, wherein the third electrode and the fourth electrode provide a second electric field to allow the second liquid crystal molecules to perform a transparent state, an absorption state, or a scattering state.

* * * * *